Oct. 3, 1950  F. N. GRASBERGER  2,524,440
MACHINE FOR MAKING WOODEN HEELS
Filed Sept. 26, 1949  2 Sheets-Sheet 2
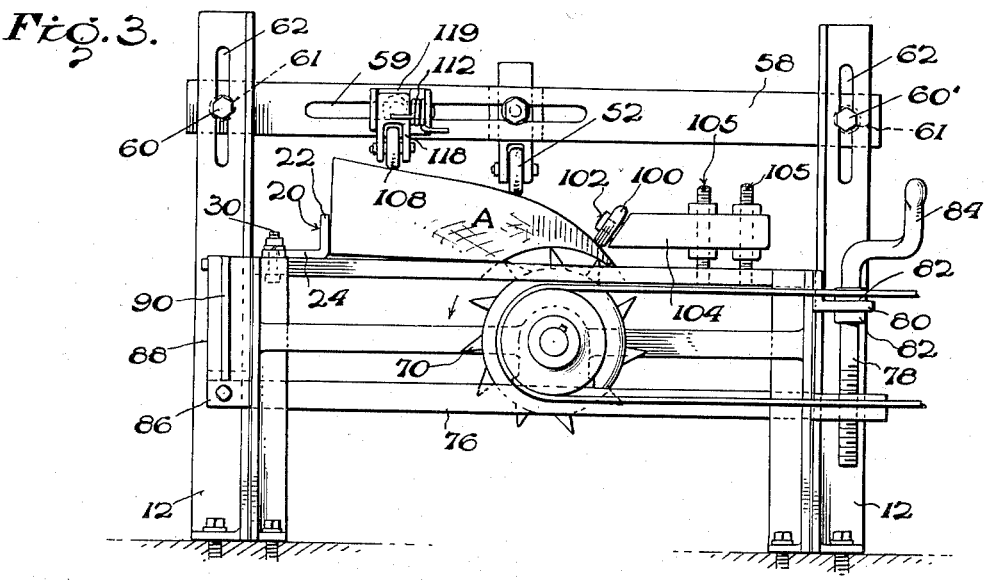
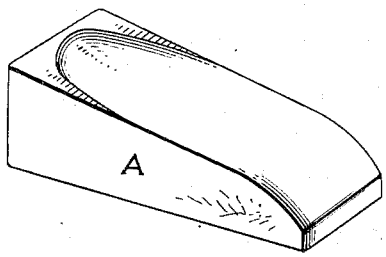
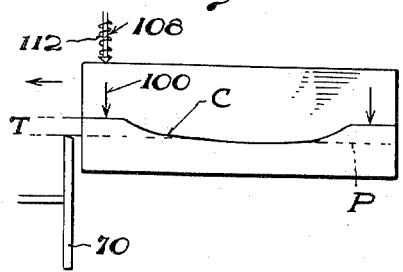
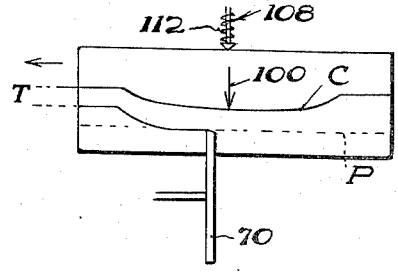
INVENTOR.
Francis N. Grasberger.
BY
Gardner J. O'Boyle
ATTORNEY Patented Oct. 3, 1950

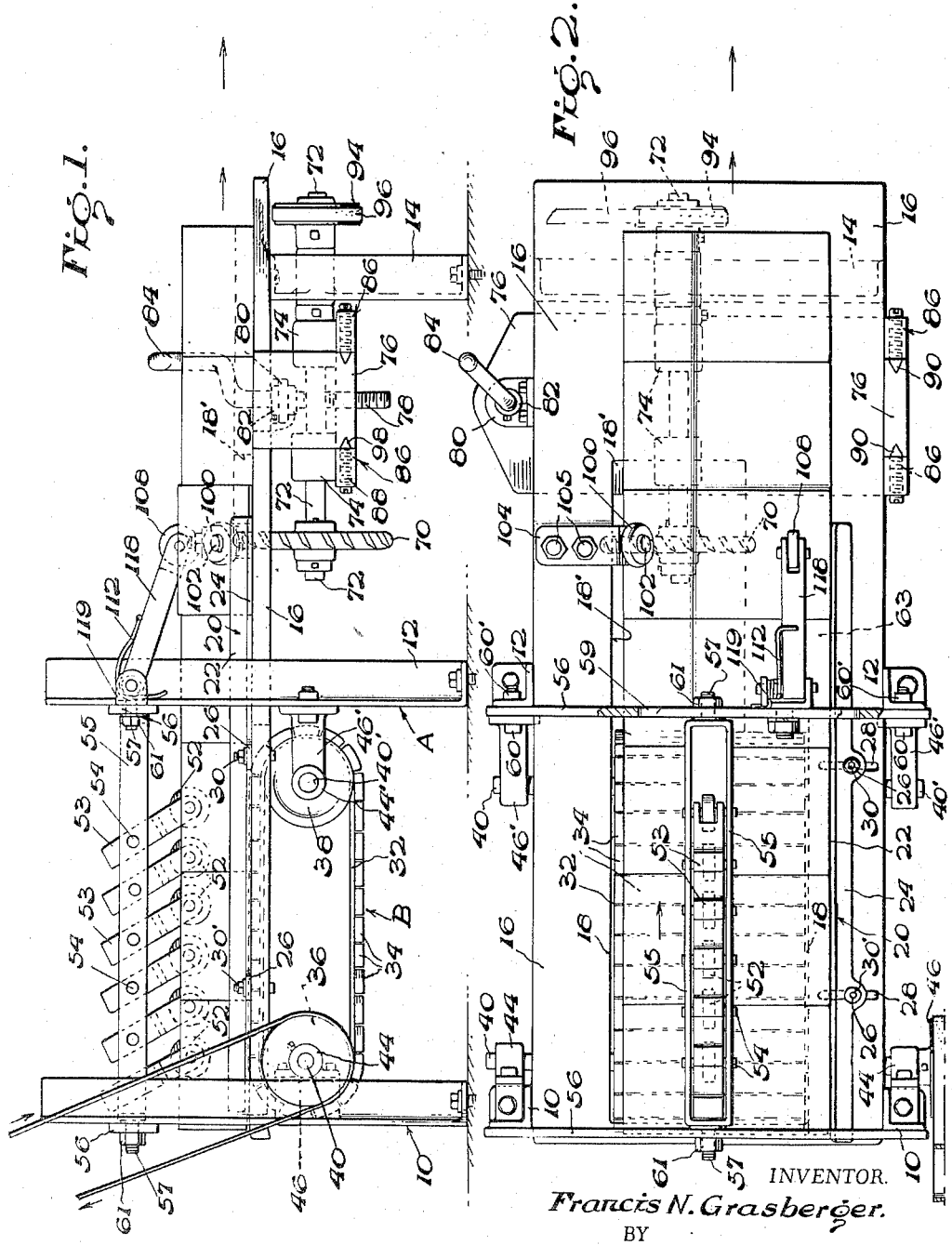

2,524,440

UNITED STATES PATENT OFFICE 2,524,440

MACHINE FOR MAKING WOODEN HEELS

Francis N. Grasberger, Lynchburg, Va.

Application September 26, 1949, Serial No. 117,883

15 Claims. (Cl. 12—47.1)

The present invention relates to wood working machines and more particularly to an improved method and apparatus for performing a shaping operation on wedge shoe heels.

In the shaping of wedge heels certain types have a portion removed from under the arch, referred to as scooping or tunneling, to provide a curvature extending from the flat heel portion to the end of the shank. As far as applicant is aware, scooping or tunneling is usually done after the wedge has otherwise been completely shaped, the accepted practice being to manually place the wedge in a chuck, pass the wedge over a cutter, then remove it from the chuck. These operations are relatively slow, and notwithstanding use of comparatively skilled operators, considerable wastage occurs due to splitting.

An object of my invention is to provide an improved machine for scooping or tunneling wedge heels.

Another object of my invention is to provide an improved method for scooping or tunneling wedges.

Still another object of my invention is to provide a machine wherein automatic scooping or tunneling is accomplished, the machine being of such simple and rugged construction that it may be operated efficiently and with a high rate of production by unskilled labor.

Yet another object of my invention is to provide a machine for scooping or tunneling wedges constructed and arranged whereby a predetermined uniform cut is obtained.

A further object of my invention is to provide a machine for scooping or tunneling wedges wherein wastage due to splitting is substantially completely eliminated.

With these and other objects in view, which may be incident to my improvements, the invention consists in the parts and combinations to be hereinafter set forth and claimed, with the understanding that the several necessary elements, comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a side view of a machine incorporating the invention herein;

Fig. 2 is a plan view of Fig. 1;

Fig. 3 is an end view as seen looking at the discharge end of the machine;

Fig. 4 is a view of the wedge with the heel and shank seat formed; and

Figs. 5 and 6 are schematic views showing the method of scooping or tunneling.

The machine of the present invention is adapted to shape the shank of a wedge blank of the type shown in Fig. 5, wherein the shank and heel concavity have been cut, but the sides thereof have not been turned. The wedges are automatically fed into the forward or feed end of the machine in side-by-side abutment, i. e., with their length transverse of the machine, scooped and then discharged from the after, or discharge end of the machine.

Referring to the drawings, and more particularly to Figs. 1 and 2, the machine includes transversely spaced L-shaped forward uprights 10, central uprights 12, and rear uprights 14, designed to support a horizontal table member 16, preferably welded to the uprights. The table 16 is formed with a rectangular opening 18, extending substantially three-quarters the length of the machine, the portion of the opening forward of the central uprights being wider than the rear portion thereof, for purposes to be described hereinafter. The table carries an L-shaped guide or positioning bar, designated generally by the numeral 20, against which the back of the wedge is placed. The bar 20 extends longitudinally of the table and is arranged with one leg 22 vertical to the plane of the table, and the other leg 24 resting thereon and extending outwardly toward the edge of the table. The leg 24 is provided with spaced openings 26 (Figs. 1 and 2) aligned with transverse slots 28 in the table and through which locking bolts 30 may be passed to secure the guide bar 20 in any adjusted position, depending upon the length of the wedge.

Positioned in the opening 18 between the forward and central uprights is a conveyor means B, including an endless belt 32, having transverse treads 34 thereon, the treads being of width substantially equal to the width of the opening 18. The belt 32 is mounted on drums 36 and 38, secured to suitable shafts 40, 40', respectively, for rotation therewith. The end portions of the shaft 40 are mounted in bearings 44 carried by brackets 46, attached to the forward uprights 10, and shaft 40' is similarly supported on bearings 44' carried by brackets 46' secured to the central uprights 12.

Associated with and above the conveyor are a plurality of gravity or spring actuated pressure rollers 52, rotatably mounted at the lower ends of supporting arms 53, the latter being pivoted as at 54, to a longitudinally extending rectangular frame 55. The frame 55 is adjustably mounted at each end in a cross member 56, extending between the pairs of forward uprights 10 and center uprights 12, the ends of frame member 55 being supported by studs 57 extending through transverse slots 59 in the cross members 56 for receiving securing nuts 61, whereby the rollers may be adjusted transversely of the machine. In order to compensate for different wedge depths, the cross members 56 are also vertically adjustable, the ends of each cross member being secured in position by a bolt 60 and nut 60' extending through an opening in the cross member and an aligned vertical slot 62 in the supporting uprights (Fig. 3).

With reference to the structure so far described, it may be considered as the conveying zone inasmuch as the work pieces or wedges A are fed onto the conveyor treads 40 beneath the rollers 52, the latter being adjusted to a proper height whereby they will exert sufficient pressure on the wedges to keep them in contact with the treads but without impeding their forward motion. Upon leaving the conveyor, the wedges pass into what may be termed the scooping zone, the heel portions of the wedges being supported on the table top shelf 63 and the forward shank portion being unsupported and overlying the narrowed portion 18' of opening 18.

Positioned in the opening 18' is a rotary cutter 70, the latter being mounted on a longitudinally extending shaft 72, whereby the cutter is arranged transversely of the table. The shaft 72 is mounted in spaced bearings 74 carried on a vertically adjustable horizontal platform 76, which is adjustably carried on the lower threaded end of a vertically arranged adjusting lever 78, rotatably mounted in a bracket 80 welded or otherwise secured to the table top (Fig. 3). Secured on the lever above and below the bracket are collars 82, whereby upon rotation of the handle portion 84, the platform will be raised or lowered. To prevent the platform 76 from rotating, the end opposite the lever is provided with a pair of projections 86 which straddle a guide plate 88 vertically depending from the table top and welded thereto. Each side of plate 88 has a vertical groove 90 therein for receiving the corresponding shaped end of a guide pin 92 extending through the adjacent projection 86. By the aforesaid means, the cutter may be raised or lowered as necessary to dispose a portion above the table top in the path of the wedges. The cutter may be driven in any suitable manner, in the embodiment shown there being provided with a pulley 94 connected through a belt 96 to any suitable source of power, not shown.

Adapted to cooperate with the cutter 70, and to set or position the wedge in proper cutting or scooping engagement, is a setting or positioning roller 100 rotatably mounted above the cutter periphery on an axis 102 carried on the inner end of a horizontally arranged and transversely extending supporting arm 104. The arm 104 is vertically adjustable on supporting studs 105 arranged transversely of the machine and extending vertically from the top plate. As best seen in Fig. 3, the axis of the positioning roller is preferably arranged at an angle of approximately 45° to the vertical, whereby it will be in a plane at substantially right angles to the point of contact on the wedge. There is further associated with the cutting means a biasing roller 108 rotatably mounted on a transverse pivot in the bifurcated end of a lever 118 pivotally mounted on a bracket 119 adjustably mounted in the cross member 56. The lever 118 is normally biased toward rotation in a clockwise direction by a spring 112 which is further tensioned when a wedge enters under the roller.

It will also be noted that the centers of the pivots of rollers 100 and 108 are in the same vertical plane, and that this plane is parallel to the forward face of the cutter 70. Thus, as a wedge comes into alignment with the roller centers, it is engaged by the rotary cutter 70. Moreover, the arrangement is such that the positioning roller 100 is to one side of the axis of the cutter and the biasing roller to the other, with the edge of the shelf 63 intermediate of the biasing roller and cutter. The reasons for this arrangement will become apparent from the following description of the method of operation.

Considering the operation in the cutting zone, the positioning or setting roller 100 and rotary cutter will initially be adjusted relative to one another to provide the proper spacing for the desired depth of cut. The axis of roller 100 must be positioned so that the approaching wedge will be engaged in its third quadrant, whereupon further pressure will cause the wedge to enter under the roller. In entering under the roller, the forward or shank edge of the wedge will be forced or pivoted downwardly and the heel end upwardly, the end of shelf 63 now functioning as the pivot bar on which the wedge is totally supported. Upon engaging roller 100, the wedge will also have passed under the biasing roller 108, which will continue to exert a downward force thereon tending to pivot the heel downwardly and thus keep the shank in contact with roller 100. As the wedge comes into engagement with the cutter, it will be backed by the successive wedges which hold it firm and also assist in absorbing the force with the result that face splitting is substantially completely eliminated.

If the top of the wedge is flat, it will be forced past the cutter in a given plane, and due to the pivoted position, a uniform straight line cut will be obtained. In like manner, if the heel is concaved, a uniform cut will be obtained on the front of shank portion of the heel, and at the same time, the breast line formed by this cutter will remain a straight line. This is due to the fact that the breast line of the heel block is at the point where the block pivots. This action is illustrated in the exaggerated schematic views of Figs. 5 and 6. As there is shown, the wedge has a concavity designated as C and the pivot designated by the broken line P. Upon the wedge engaging the cutter, it will leave a front edge having a thickness T. As the wedge moves forwardly, the concavity will come beneath roller 100, however, upon so doing, the biasing roller 108 will pivot the block so that contacting engagement between the shank and roller 100 is retained. In this way, the front edge thickness T will be uniform across the wedge.

From the foregoing it will be seen that there is provided a machine wherein a plurality of wedges are fed successively, in side-by-side abutting engagement to a cutting device, together with means for adjusting the foremost wedge to proper cutting position and holding it in proper position throughout the cut. As the entire operation is automatic, a uniform scooping of the wedges is assured, with a very high rate of production. Moreover, as the adjustments are all very simple, the machine may be operated by relatively unskilled labor.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In a machine of the character described, cutting means for scooping the shank of a heel wedge, means associated with the cutter means for setting the wedge in cutting position, and means for maintaining a wedge in engagement with the setting means throughout the cut.

2. In a machine of the character described, rotary cutting means for scooping the shank of a heel wedge, means associated with the cutting means and to one side of the axis thereof for setting the wedge in cutting position, and means located to the other side of the axis of the cutting means for maintaining the wedge in engagement with the setting means.

3. In a machine of the character described, a rotary cutter, a support for one end of a heel wedge located to one side of the axis of the cutter, a biasing roller located above said support, and a positioning roller associated with the cutter and located on the other side of the axis thereof.

4. In a machine of the character described, a support for one end of a heel wedge, biasing means positioned above said support, cutting means adjacent said support and at right angles thereto, and setting means associated with the cutting means to the side away from said support.

5. In a machine of the character described, a longitudinally extending shelf for supporting the heel portion of a wedge, a biasing roller disposed above the shelf for engaging the top surface of the wedge supported portion, a transversely disposed rotary cutter positioned adjacent the shelf to scoop the unsupported portion of the wedge, and a positioning roller disposed above the cutter for engaging the top surface of the wedge unsupported portion.

6. In a machine of the character described, a transversely disposed rotary cutter, a positioning roller adjacent the cutter and to one side of the axis thereof, a work support adjacent the cutter and to the other side of the axis thereof, and a biasing roller above said work support.

7. In a machine of the character described, a transversely disposed rotary cutter, a longitudinally disposed positioning roller adjacent the cutter and to one side of the axis thereof, a work support adjacent the cutter and to the other side of the axis thereof, and a longitudinally disposed biasing roller above the work support.

8. In a machine of the character described, a conveyor for continuously moving a plurality of heel wedges in side by side abutment, a plurality of pressure rollers disposed above the conveyor for engaging the supported wedges, a longitudinally extending shelf onto which the wedges are fed, a transversely disposed rotary cutter adjacent the shelf and in the path of movement of the wedges, a positioning roller spaced above the cutter and to one side of the axis thereof, for engaging the top surface of the wedges, and a biasing roller for engaging the top surface of the wedges to the other side of the axis of the cutter.

9. In a machine of the character described, a conveyor for continuously moving a plurality of heel wedges in side by side abutment, a longitudinally extending shelf onto which the wedges are fed, a transversely disposed rotary cutter adjacent the shelf and in the path of movement of the wedges, a positioning roller spaced above the cutter and to one side of the axis thereof, for engaging the top surface of the wedges, and a biasing roller for engaging the top surface of the wedges to the other side of the axis of the cutter.

10. In a machine of the character described, a conveyor for continuously moving a plurality of heel wedges in side by side abutment, a longitudinally extending shelf onto which the wedges are fed, a transversely disposed rotary cutter adjacent the shelf and in the path of movement of the wedges, a positioning roller spaced above the cutter and to one side of the axis thereof, for engaging the top surface of the wedges, means for varying the spacing between the cutter and positioning roller, and a biasing roller for engaging the top surface of the wedges to the other side of the axis of the cutter.

11. In a machine for scooping the shank of wedge heels, wedge feeding means, a rotary cutter fed by said feeding means, and means associated with said cutter for engaging and tilting the wedges to cutting position.

12. In a machine for scooping the shank of wedge heels, wedge feeding means, a pivot bar onto which the wedges are fed, means for pivoting the wedge about the pivot bar and into cutting position, and a cutter for scooping the wedge in its cutting position.

13. The method of scooping wedge heels which comprises arranging a plurality of wedges in side by side abutment, simultaneously moving said wedges forward, tilting the foremost wedge to lower the arch end and raise the heel end, then moving the lowered end of the tilted wedge across the cutter.

14. The method of scooping a wedge heel which comprises moving the wedge forward, tilting the wedge to lower the shank end and raise the heel end, then moving the lowered end of the tilted wedge across a cutter.

15. In a machine of the character described, a horizontal table top having a wide rectangular opening in its forward part and a narrower portion extending into its after part, a conveyor means disposed in the wide rectangular opening, pressure rollers positioned above said conveyor means, a transverse rotary cutter disposed in the narrower part of the opening, a positioning roller carried to one side of the cutter and a biasing roller carried on the other side and above the table top.

FRANCIS N. GRASBERGER.

No references cited.